(12) United States Patent
Mayer et al.

(10) Patent No.: US 6,756,454 B1
(45) Date of Patent: Jun. 29, 2004

(54) PROCESS FOR REDUCING THE ODOR OF VINYLAROMATIC-1,3-DIENE COPOLYMER DISPERSIONS STABILIZED BY PROTECTIVE COLLOIDS

(75) Inventors: Theo Mayer, Julbach (DE); Peter Ball, Emmerting (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/856,190

(22) PCT Filed: Oct. 14, 1999

(86) PCT No.: PCT/EP99/07708

§ 371 (c)(1),
(2), (4) Date: May 17, 2001

(87) PCT Pub. No.: WO00/31147

PCT Pub. Date: Jun. 2, 2000

(30) Foreign Application Priority Data

Nov. 19, 1998 (DE) .......................... 198 53 421

(51) Int. Cl.[7] .......................... C08F 6/16; C08F 212/04; C08F 289/00; C08J 3/12; C08L 25/10
(52) U.S. Cl. .......................... 526/78; 526/79; 526/80; 526/87; 526/340; 524/458
(58) Field of Search ........................... 524/458; 526/78, 526/79, 80, 87, 340

(56) References Cited

U.S. PATENT DOCUMENTS 4,529,753 A * 7/1985 Taylor .......................... 523/328
6,417,297 B1 * 7/2002 Mayer et al. .................. 526/78

FOREIGN PATENT DOCUMENTS

| DE | 4419518 | 12/1995 |
| DE | 19728997 | 2/1998 |
| DE | 19807561 | 8/1998 |
| EP | 0028348 | 5/1981 |
| EP | 0327006 | 8/1989 |
| WO | 98/11156 | 3/1998 |
| WO | 99/16794 | 4/1999 |

OTHER PUBLICATIONS

Derwent Abstract corresponding to EP 0327006 [AN 1989—229056].
Derwent Abstract corresponding to DE 4419518 [AN 1996—021300].
Derwent Abstract corresponding to DE 19728997 [AN 1998—121682].
Derwent Abstract corresponding to WO 98/11156 [AN 1998—170089].
Derwent Abstract corresponding to DE 19807561 [AN 1998—458193].
Derwent Abstract corresponding to WO 99/16794 (PCT/EP98/06102) [AN 1999—255060].

* cited by examiner

Primary Examiner—James J. Seidleck
Assistant Examiner—U. K. Rajguru
(74) Attorney, Agent, or Firm—Brooks Kushman P.C.

(57) ABSTRACT

The invention relates to a method for reducing odor emissions of aqueous aromatic vinyl-1,3-diene-copolymer dispersions which have been stabilized with a protective colloid. The invention also relates to redispersion powders obtained by drying said dispersions. This is achieved by emulsion polymerization of a mixture containing at least one aromatic vinyl and at least one 1,3-diene in the presence of one or more protective colloids and by optionally drying the polymer dispersion obtained thereby. The invention is characterized in that 0.01 to 15.0 wt. % of one or more monomers selected from the group of branched or unbranched alkyl esters containing 1 to 8 carbon atoms in the alkyl radical of monounsaturated mono- or dicarboxylic acids are added at the end of the polymerization when the total content of the aqueous polymer dispersion containing free monomers ranges from >0 to ≦20 wt. %, whereby the given wt. % refers to the polymer content of the dispersion.

17 Claims, No Drawings

PROCESS FOR REDUCING THE ODOR OF VINYLAROMATIC-1,3-DIENE COPOLYMER DISPERSIONS STABILIZED BY PROTECTIVE COLLOIDS

The invention relates to a process for reducing the odor emission of aqueous protective-colloid-stabilized vinylaromatic-1,3-diene copolymer dispersions, and also of redispersion powders which are obtainable by drying polymer dispersions of this type.

Aqueous polymer dispersions based on vinylaromatic-1, 3-diene copolymer dispersions and redispersion powders obtainable therefrom, generally by spray drying, are used chiefly in the construction sector as agents for increasing the quality of finished pulverulent mixtures of cement or non-cement type. A problem with dispersions and redispersion powders of this type is that they generally still comprise volatile high-odor constituents, e.g. mercaptans which serve as molecular weight regulators during the polymerization, ammonia, which is used for neutralization, residual monomers, non-polymerizable contaminants of the monomers, volatile reaction products formed from the monomers under the conditions of the reaction, or also volatile degradation products of the polymers. The resultant odor is perceived as unpleasant both by the producers and by the users, and there is therefore a need for deodorized aqueous polymer dispersions.

It is known that polymer dispersions can be deodorized by physical chemical post-treatment. An example of a physical process is a distillative process, in particular steam distillation, or stripping using inert gases, as mentioned, for example, in EP-A 327006. A disadvantage of this process is that many dispersions do not have sufficient stability for this type of deodorization, and coagulation therefore occurs, requiring complicated filtration before subsequent use. Another disadvantage of the process is that although it is capable of reducing the proportion of volatile substances in the aqueous polymer dispersion it does not resolve the issue of disposal of these substances.

It is also known that polymer dispersions can be freed from high-odor monomers by chemical post-treatment. For example, DE-A 4419518 describes a chemical process for lowering the amount of residual monomers by free-radical post-polymerization with exposure to redox initiator systems. U.S. Pat. No. 4,529,753 describes a process in which the residual monomer content of aqueous polymer dispersions can be reduced by free-radical post-polymerization brought about by particular free-radical redox initiator systems after the main polymerization reaction is complete. Redox initiator systems of this type include at least one oxidant, at least one reducing agent, and one or more transition metal ions which occur in different valence states.

However, a disadvantage of the processes recommended above is that although they can bring about some reduction of residual monomer content when used in high-odor polymer dispersions, such as styrene-butadiene dispersions, they are not able effectively to reduce the unpleasant odor brought about by styrene and high-odor byproducts, for example mercaptans, non-polymerizable contaminants of the monomers, volatile reaction products of the monomers or volatile degradation products of the polymers.

DE-A 19728997 describes deodorized aqueous polymer dispersions obtainable by adding the zinc salt of ricinoleic acid and/or the zinc salt of abietic acid or, respectively, analogous resin acids and/or other zinc salts of other saturated or unsaturated hydroxylated fatty acids having 16 or more carbon atoms. A disadvantage of this method, however, is that, due to additional electrolyte loading, it impairs the stability this method, however, is that, due to additional electrolyte loading, it impairs the stability of the aqueous polymer dispersion.

The adsorbing action of adsorbents with respect to volatile organic substances is known. WO-A 98/11156 describes a process in which adding even small amounts (from 0.1 to 20% by weight, based on polymeric constituents of the dispersion) of active carbon in polymer dispersions binds the odor-forming volatile contaminants so strongly that these are practically no longer detectable either in the polymer dispersions or in the products produced using the polymer dispersions. A disadvantage of this process is that the residence time of the active carbon is up to two more hours for effective odor reduction, and the dispersion generally then has to be filtered (in particular for pigmented systems, e.g. emulsion paints) before further use. This is a disadvantage both from an economic point of view and also ecologically, especially since the disposal of the contaminated active carbon filtered off is an issue which remains open.

EP-A 283348 relates to a process for removing residual monomer, i.e. unreacted acrylonitrile, from acrylonitrile polymer dispersions by post-polymerization via addition of any desired monomers copolymerizable with acrylonitrile. In contrast, the object of the present application also includes minimizing the nuisance caused by non-polymerizable odoriferous substances.

Aqueous protective-colloid-stabilized styrene-butadiene polymer dispersions are two-phase systems which are composed of an aqueous phase and a polymer phase. Both the dispersed polymer particles and the aqueous dispersion medium are locations where high-odor constituents may be present. Between these two phases a distribution equilibrium becomes established. The disadvantage of the known methods for reducing the proportion of volatile constituents in aqueous polymer dispersions is, specifically, that they essentially affect either solely the aqueous dispersion or solely the polymer particles. This means that any significant total reduction in the proportion of volatile constituents in the aqueous polymer dispersion will essentially be diffusion-controlled (reestablishment of the distribution equilibrium) and this is probably the reason for the unsatisfactory rate of reduction in the proportion of volatile odoriferous materials in aqueous polymer dispersions when the known methods are used.

Surprisingly, it has been found that deodorization of the odoriferous materials located both in the aqueous phase and the polymer phase takes place if, toward the end of the main polymerization, esters of unsaturated carboxylic acids are added to the reaction mixture.

The invention provides a process for reducing the odor emission of aqueous protective-colloid-stabilized vinylaromatic-1,3-diene copolymer dispersions and of redispersion powders obtainable therefrom by drying, by emulsion polymerization of a mixture comprising at least one vinylaromatic and at least one 1,3-diene in the presence of one or more protective colloids and, if desired, drying the resultant polymer dispersion, which comprises, toward the end of the polymerization, when the total free monomer content of the aqueous polymer dispersion is from 0 to 20% by weight, adding from 0.01 to 15.0% by weight of one or more monomers selected from the class consisting of branched or unbranched alkyl esters, having from 1 to 8 carbon atoms in the alkyl radical, of monounsaturated mono- or dicarboxylic acids, where the data in % by weight are in each case based on the polymer content of the dispersion.

Preference is given to adding the alkyl esters of acrylic acid, methacrylic acid, fumaric acid, maleic acid or itaconic acid, such as methyl methacrylate, methyl acrylate, n-butyl methacrylate, n-butyl acrylate, ethyl methacrylate, ethyl acrylate, 2-ethylhexyl methacrylate, 2-ethylhexyl acrylate, diisopropyl fumarate, diethyl fumarate or mixtures of these. n-Butyl acrylate is particularly preferred.

The alkyl esters mentioned may be added as such or in aqueous emulsion. The amount added is preferably from 0.1 to 5% by weight, based on the polymer content of the aqueous polymer dispersion. The addition takes place toward the end of the polymerization, when the total free monomer content of the aqueous polymer dispersion is from 0 to 20% by weight, in other words the conversion of the entire amount of monomer used is from 80 to <100%. The addition preferably takes place when the total free monomer content of the aqueous dispersion, based on the polymer content of the dispersion, has fallen to from 5 to 15% by weight, corresponding to a conversion of from 85 to 95%. After adding the alkyl esters the polymerization is continued until no further monomer conversion can be detected.

Suitable vinylaromatics are styrene and methylstyrene, and preference is given to copolymerizing styrene. Examples of 1,3-dienes are 1,3-butadiene and isoprene, preferably 1,3-butadiene. The copolymers generally comprise from 20 to 80% of vinylaromatic and from 20 to 80% of 1,3-diene and, if desired, other monomers may be present. In each case the data in percent by weight give 100% by weight in total.

Examples of other monomers are monomers copolymerizable with vinylaromatics and with 1,3-dienes, for example ethylene, vinyl chloride, (meth)acrylates of alcohols having from 1 to 15 carbon atoms or vinyl esters of unbranched or branched carboxylic acids having from 1 to 15 carbon atoms, of comonomers such as ethylenically unsaturated mono- and dicarboxylic acids, ethylenically unsaturated carboxamides, ethylenically unsaturated carbonitriles, mono- and diesters of fumaric acid and maleic acid, maleic anhydride, ethylenically unsaturated sulfonic acids, comonomers with more than one ethylenic unsaturation or post-crosslinking comonomers, epoxy-functional comonomers, or silicon-functional comonomers, monomers with hydroxyl or CO groups. Suitable monomers and comonomers are described, for example, in the PCT application PCT/EP98/06102, the disclosure of which on this matter is incorporated into this application by way of reference.

Preparation by emulsion polymerization takes place at from 40 to 100° C., preferably from 60 to 90° C. The polymerization is initiated with commonly used emulsion-polymerization initiators or redox-initiator combinations, for example hydroperoxides, such as tert-butyl hydroperoxide, azo compounds, such as azobisisobutyronitrile, or inorganic initiators, such as the sodium, potassium and ammonium salts of peroxodisulfuric acid. The amount used of the initiators mentioned is generally from 0.05 to 3% by weight, based on the total weight of the monomers. Redox initiators used are combinations of the initiators mentioned with reducing agents, such as sodium sulfite, sodium hydroxymethanesulfinate, or ascorbic acid. The amount of reducing agent is preferably from 0.01 to 5.0% by weight, based on the total weight of the monomers.

The polymerization mixture is stabilized using protective colloids, preferably without additional emulsifiers. Suitable protective colloids are fully or partially hydrolyzed polyvinyl acetates. Other suitable polyvinyl acetates are partially hydrolyzed hydrophobicized polyvinyl acetates, and the hydrophobicization may, for example, take place by copolymerizing with isopropenyl acetate, ethylene or vinyl esters of saturated alpha-branched monocarboxylic acids having from 5 to 11 carbon atoms. Other examples are polyvinylpyrrolidones; polysaccharides in water-soluble form, such as starches (amylose and amylopectin), celluloses and carboxymethyl, methyl, hydroxyethyl or hydroxypropyl derivatives of these; proteins, such as casein or caseinate or soya protein or gelatine; ligninsulfonates; synthetic polymers, such as poly(meth)acrylic acid, copolymers of (meth)acrylates with carboxyl-functional comonomer units, poly(meth)acrylamide, polyvinylsulfonic acids and water-soluble copolymers of these; melamine-formaldehyde sulfonates, naphthalene-formaldehyde-sulfonates, styrene-maleic acid copolymers, vinyl ether-maleic acid copolymers and dextrins, such as yellow dextrin.

Preference is given to the partially hydrolyzed polyvinyl acetates and partially hydrolyzed hydrophobicized polyvinyl acetates mentioned. Particular preference is given to partially hydrolyzed polyvinyl acetates with a degree of hydrolysis from 80 to 95 mol % and a Höppler viscosity (4% strength aqueous solution, DIN 53015, Höppler method at 20° C.) of from 1 to 30 mPas, preferably from 2 to 15 mPas.

The total amount of the protective colloids generally used in the polymerization is from 1 to 15% by weight, based on the total weight of the monomers. Some of the protective colloid here is preferably within the initial charge and some is fed once the polymerization has been initiated. All of the monomers may be within the initial charge, or all may be fed, or proportions may be within the initial charge and the remainder fed once the polymerization has been initiated. A suitable preparation process is described, for example, in the PCT application PCT/EP98/06102, the disclosure of which in this connection is incorporated into this application by way of reference. The resultant aqueous dispersions have a solids content of from 30 to 75% by weight, preferably from 40 to 65% by weight.

To prepare the water-redispersible polymer powders, the aqueous dispersions are dried, for example by fluidized-bed drying, freeze drying or spray drying. The dispersions are preferably spray dried. The spray drying here takes place in conventional spray drying systems, and single-, two- or multi-fluid nozzles, or a rotating disk, may be used for atomization. The discharge temperature chosen is generally from 55 to 100° C., preferably from 70 to 90° C., depending on the system, the Tg of the resin and the desired degree of drying. The spraying is described in the PCT application PCT/EP98/06102, the disclosure of which in this connection is incorporated into this application by way of reference.

Surprisingly, it has been found that the deodorization acts on odor emitters in both the aqueous and the polymer phase of the dispersion. However, it is advantageous that even small amounts of carboxylic ester have a sufficient deodorizing action, and its addition does not therefore generally impair the performance properties of the aqueous polymer dispersion. The stability of distribution of the dispersion and the suitability of the dispersion for subsequent spray drying are also not impaired.

The polymer dispersions, and the dispersion powders prepared therefrom by drying, which have reduced odor emission can be used in a conventional manner known to the skilled worker to give industrial products, for example as a constituent of the formulation in combination with inorganic, hydraulically setting binders in construction adhesives, renders, troweling compositions, floor-filling compositions, jointing mortars, plaster or paints, or also as sole binders for coating compositions and adhesives, or also as coating compositions or binders for textiles or paper.

The examples listed below are intended to illustrate the invention but not to restrict the same.

EXAMPLE 1

3.41 l of deionized water and 3.85 kg of a 20% strength aqueous solution of a partially hydrolyzed polyvinyl acetate with a degree of hydrolysis of 88 mol %, a Höppler viscosity of the 4% strength solution of 4 mPas (DIN 53015, Höppler method at 20° C.) form the initial charge in a stirred autoclave of capacity about 16 l. 10% strength by weight formic acid was used to adjust the pH to 4.0–4.2. The system was then evacuated, flushed with nitrogen and evacuated again, and a mixture of 4.56 kg of styrene, 2.45 kg of 1,3-butadiene and 48.1 g of tert-dodecyl mercaptan was introduced by suction. After heating to 80° C. the polymerization was initiated by running in, simultaneously, two catalyst solutions of which the first was composed of 197 g of deionized water and 66 g of a 40% strength aqueous tert-butyl hydroperoxide solution and the other of 508 g of deionized water and 57 g of sodium formaldehyde-sulfoxylate. The feed rate for the peroxide solution was 44 ml/h and that for the sodium formaldehyde-sulfoxylate solution was 94 ml/h. 3.5 hours after the polymerization had begun the conversion of the monomers forming the initial charge was 87%. At this juncture the feed of 315 g of butyl acrylate began at a rate of 630 g/h. 2 hours after the butyl acrylate feed had been completed the initiator feeds were stopped, the reactor contents cooled to 50° C. and stirring continued for one hour in vacuo.

This gave a stable, coagulate-free dispersion with an average particle size (weight average) of 490 nm with a solids content of 49.3% and a viscosity (Brookfield viscometer, 20° C., 20 rpm) of 3200 mPas.

400 parts by weight of the dispersion were admixed with 200 parts by weight of a 10.3% strength by weight solution of a polyvinyl alcohol (partially hydrolyzed polyvinyl acetate, degree of hydrolysis 88 mol %, viscosity of the 4% strength solution: 13 mPas), 0.84 parts by weight of antifoam and 135 parts by weight of water, and thoroughly mixed. The dispersion was sprayed through a two-fluid nozzle. The spraying component used was air compressed to 4 bar, and the droplets formed were dried cocurrently with air heated to 125° C.

The resultant dry powder was admixed with 10% of commercially available antiblocking agent (mixture of calcium magnesium carbonate and magnesium hydrosilicate).

EXAMPLE 2

The dispersion was prepared as in Example 1 except that 3.5 hours after the polymerization had begun (87% monomer conversion) 315 g of methyl acrylate (instead of butyl acrylate) were fed within 30 min.

This gave a stable, coagulate-free dispersion with an average particle size (weight average) of 512 nm with a solids content of 50.2% and a viscosity (Brookfield viscometer, 20° C., 20 rpm) of 2750 mPas.

All other measures for preparing the dispersion powder were as in Example 1.

EXAMPLE 3

The dispersion was prepared as in Example 1 except that 3.5 hours after the polymerization had begun (87% monomer conversion) 315 g of ethyl acrylate (instead of butyl acrylate) were fed within 30 min.

This gave a stable, coagulate-free dispersion with an average particle size (weight average) of 550 nm with a solids content of 50.9% and a viscosity (Brookfield viscometer, 20° C., 20 rpm) of 3950 mPas.

All other measures for preparing the dispersion powder were as in Example 1.

EXAMPLE 4

The dispersion was prepared as in Example 1 except that 3.5 hours after the polymerization had begun (87% monomer conversion) 315 g of 2-ethylhexyl acrylate (instead of butyl acrylate) were fed within 30 min.

This gave a stable, coagulate-free dispersion with an average particle size (weight average) of 635 nm with a solids content of 51.6%, and a viscosity (Brookfield viscometer, 20° C., 20 rpm) of 3750 mPas.

All other measures for preparing the dispersion powder were as in Example 1.

EXAMPLE 5

The dispersion was prepared as in Example 1 except that 3.5 hours after the polymerization had begun (87% monomer conversion) 315 g of methyl methacrylate (instead of butyl acrylate) were fed within 30 min.

This gave a stable, coagulate-free dispersion with an average particle size (weight average) of 489 nm with a solids content of 52.5% and a viscosity (Brookfield viscometer, 20° C., 20 rpm) of 6450 mPas.

All other measures for preparing the dispersion powder were as in Example 1.

COMPARATIVE EXAMPLE 6

The dispersion was prepared as in Example 1 except that 3.5 hours after polymerization had begun (87% monomer conversion). 315 g of acrylic acid (instead of butyl acrylate) were fed within 30 min.

This gave a stable, coagulate-free dispersion with an average particle size (weight average) of 946 nm with a solids content of 50.5% and a viscosity (Brookfield viscometer, 20° C., 20 rpm) of 1930 mPas.

All other measures for preparing the dispersion powder were as in Example 1.

COMPARATIVE EXAMPLE 7

The dispersion was prepared as in Example 1 except that 3.5 hours after polymerization had begun (87% monomer conversion) 315 g of methacrylic acid (instead of butyl acrylate) were fed within 30 min.

This gave a stable, coagulate-free dispersion with an average particle size (weight average) of 865 nm with a solids content of 51.1% and a viscosity (Brookfield viscometer, 20° C., 20 rpm) of 2450 mPas.

All other measures for preparing the dispersion powder were as in Example 1.

EXAMPLE 8

The dispersion was prepared as in Example 1 except that 3.5 hours after the polymerization had begun (87% monomer conversion) 315 g of diisopropyl fumarate (instead of butyl acrylate) were fed within 30 min.

This gave a stable, coagulate-free dispersion with an average particle size (weight average) of 564 nm with a solids content of 51.3%, and a viscosity (Brookfield viscometer, 20° C., 20 rpm) of 4210 mPas.

All other measures for preparing the dispersion powder were as in Example 1.

EXAMPLE 9

The dispersion was prepared as in Example 1 except that 3.5 hours after the polymerization had begun (87% monomer conversion) 315 g of diethyl fumarate (instead of butyl acrylate) were fed within 30 min.

This gave a stable, coagulate-free dispersion with an average particle size (weight average) of 652 nm with a solids content of 52.1% and a viscosity (Brookfield viscometer, 20° C., 20 rpm) of 3750 mPas.

All other measures for preparing the dispersion powder were as in Example 1.

COMPARATIVE EXAMPLE 10

The dispersion was prepared as in Example 1 except that 3.5 hours after polymerization had begun (87% monomer conversion) 315 g of monoethyl fumarate (instead of butyl acrylate) were fed within 30 min.

This gave a stable, coagulate-free dispersion with an average particle size (weight average) of 856 nm with a solids content of 51.1% and a viscosity (Brookfield viscometer, 20° C., 20 rpm) of 4750 mPas.

All other measures for preparing the dispersion powder were as in Example 1.

COMPARATIVE EXAMPLE 11

The dispersion was prepared as in Example 1 except that no butyl acrylate was added.

This gave a stable, coagulate-free dispersion with an average particle size (weight average) of 489 nm with a solids content of 51.3% and a viscosity (Brookfield viscometer, 20° C., 20 rpm) of 3970 mPas.

All other measures for preparing the dispersion powder were as in Example 1.

Testing of the Polymer Powders

Evaluation of odor on dispersion films of redispersions of the dispersion powders.

To produce the films a dispersion of about 30% strength was produced by redispersion in water of the dispersion powders prepared. The reference substance used was a 30% strength aqueous redispersion of the dispersion powder from the comparative example.

To produce films the dispersions were poured onto a sheet of silicone rubber and then dried for 24 hours at 23° C. The resultant films of dimensions 15×10 cm were placed into a 250 ml wide-necked glass bottle, preheated to 75° C. and having a screw top, and placed for 5 minutes in a drying cabinet heated to 75° C. The samples were then allowed to cool to room temperature, and the odor was evaluated by eight test personnel using a scale of grades from 1 to 6 (odor intensity). The odor test results are given in Table 1:

TABLE 1

| | Odor test results | | | | | | | | | | |
|---|---|---|---|---|---|---|---|---|---|---|---|
| Example | 1 | 2 | 3 | 4 | 5 | C6 | C7 | 8 | 9 | C10 | C11 |
| Intensity => | | | | | | | | | | | |
| Tester 1 | 1 | 4 | 2 | 1 | 3 | 4 | 3 | 3 | 3 | 5 | 6 |
| Tester 2 | 2 | 3 | 3 | 2 | 2 | 5 | 3 | 3 | 3 | 6 | 6 |
| Tester 3 | 1 | 3 | 2 | 2 | 3 | 5 | 4 | 1 | 4 | 4 | 6 |
| Tester 4 | 1 | 4 | 4 | 1 | 4 | 2 | 3 | 3 | 3 | 5 | 5 |

TABLE 1-continued

| | Odor test results | | | | | | | | | | |
|---|---|---|---|---|---|---|---|---|---|---|---|
| Example | 1 | 2 | 3 | 4 | 5 | C6 | C7 | 8 | 9 | C10 | C11 |
| Tester 5 | 1 | 5 | 2 | 3 | 3 | 6 | 5 | 2 | 4 | 6 | 6 |
| Tester 6 | 2 | 3 | 3 | 1 | 2 | 5 | 3 | 1 | 2 | 4 | 4 |
| Tester 7 | 1 | 2 | 2 | 2 | 3 | 4 | 3 | 2 | 4 | 5 | 6 |
| Tester 8 | 2 | 5 | 3 | 1 | 2 | 3 | 4 | 3 | 3 | 4 | 6 |

The results in Table 1 show that when the novel procedure is used to deodorize polymer dispersions and dispersion powders the result is a marked reduction in undesirable odor.

Determination of sedimentation behavior of the powders (tube sedimentation):

To determine sedimentation behavior, 50 g of each dispersion powder were redispersed in 50 ml of water, then diluted to 0.5% solids content, and the height of settled solids is measured for 100 ml of this redispersion poured into a graduated tube, settlement being measured after 1 hour and 24 hours. The results of the test are given in Table 2.

Determination of blocking resistance:

To determine blocking resistance, the dispersion powder was placed in an iron tube with a thread, and then subjected to a load from a metal ram. The application of the load was followed by storage for 16 hours at 50° C. in a drying cabinet. After cooling to room temperature, the powder was removed from the tube and resistance to blocking was determined qualitatively by crushing the powder. Resistance to blocking was classified as follows:

1=very good blocking resistance
2=good blocking resistance
3=satisfactory blocking resistance
4=not resistant to blocking, powder after crushing no longer free-flowing.

The test results are given in Table 2.

TABLE 2

| Example | Tube sedimentation 1 h/24 h [cm] | Blocking resistance |
|---|---|---|
| 1 | 0.1/0.5 | 1 |
| 2 | 0.1/0.6 | 1 |
| 3 | 0.2/0.8 | 2 |
| 4 | 0.6/1.3 | 3 |
| 5 | 0.2/0.6 | 1 |
| C 6 | 0.1/0.3 | 2 |
| C 7 | 0.1/0.4 | 1 |
| 8 | 0.5/0.9 | 2 |
| 9 | 0.6/1.3 | 2 |
| C10 | 0.3/0.9 | 2 |
| C11 | 0.1/0.5 | 1 |

The results in Table 2 show that the deodorizing treatment does not generally cause any concomitant loss of powder quality.

What is claimed is:

1. In a process for preparation of aqueous protective-colloid-stabilized vinylaromatic-1,3-diene copolymer dispersions and redispersible powders obtainable therefrom by drying, said copolymer dispersions prepared by emulsion polymerizing a mixture comprising at least one vinylaromatic monomer and at least one 1,3-diene monomer in the presence of at least one protective colloid and, for redispersible powders, drying the resultant polymer dispersion, the improvement comprising reducing the odor of said copolymer dispersion by adding to the terminal portion of the polymerization, when the total free monomer content of the aqueous polymer dispersion is from 0 to 20% by weight, from 0.01 to 15.0% by weight of one or more branched or unbranched $C_{1-8}$ alkyl esters of monounsaturated mono- or dicarboxylic acids as odor-reducing monomers, where the percents by weight are in each case based on the polymer content of the dispersion.

2. The process of claim 1, wherein one or more alkyl esters of acrylic acid, methacrylic acid, fumaric acid, maleic acid or itaconic acid are said odor-reducing monomers.

3. The process of claim 1, wherein one or more esters selected from methyl methacrylate, methyl acrylate, n-butyl methacrylate, n-butyl acrylate, ethyl methacrylate, ethyl acrylate, 2-ethylhexyl methacrylate, 2-ethylhexyl acrylate, diisopropyl fumarate and diethyl fumarate are added to said polymerization.

4. The process of claim 1, wherein 20 to 80% by weight of styrene and from 20 to 80% by weight of 1,3-butadiene are copolymerized, optionally in the presence of additional monomers other than said odor-reducing monomers.

5. The process of claim 2, wherein 20 to 80% by weight of styrene and from 20 to 80% by weight of 1,3-butadiene are copolymerized, optionally in the presence of additional monomers other than said odor-reducing monomers.

6. The process of claim 3, wherein 20 to 80% by weight of styrene and from 20 to 80% by weight of 1,3-butadiene are copolymerized, optionally in the presence of other monomers other than said odor-reducing monomers.

7. An aqueous, protective-colloid-stabilized vinylaromatic-1,3diene copolymer dispersion with reduced odor emission prepared by the process of claim 2.

8. An aqueous, protective-colloid-stabilized vinylaromatic-1,3-diene copolymer dispersion with reduced odor emission prepared by the process of claim 3.

9. An aqueous, protective-colloid-stabilized vinylaromatic-1,3-diene copolymer dispersion with reduced odor emission prepared by the process of claim 3.

10. An aqueous, protective-colloid-stabilized vinylaromatic-1,3-diene copolymer dispersion with reduced odor emission prepared by the process of claim 4.

11. A redispersible protective-colloid-stabilized vinylaromatic-1,3-diene copolymer powder prepared by the process of claim 1.

12. A redispersible protective-colloid-stabilized vinylaromatic-1,3-diene copolymer powder prepared by the process of claim 2.

13. A redispersible protective-colloid-stabilized vinylaromatic-1,3-diene copolymer powder prepared by the process of claim 4.

14. In an inorganic, hydraulically setting binder in a construction adhesive, a render, a troweling compositions, a floor-filling composition, a jointing mortar, a plaster or a paint, wherein a polymer dispersion or redispersible polymer powder is employed, the improvement comprising employing as said polymer dispersion and/or said redispersible polymer powder a low odor polymer dispersion or redispersible powder prepared by the process of claim 1.

15. In a coating composition employing a binder, the improvement comprising employing as the sole binder, a low odor polymer dispersion or redispersible powder prepared by the process of claim 1.

16. In an adhesive wherein a polymer dispersion or redispersible polymer powder is employed, the improvement comprising employing as said polymer dispersion and/or said redispersible polymer powder a low odor polymer dispersion or redispersible powder prepared by the process of claim 1.

17. In a coating composition or binder for textiles or paper, wherein a polymer dispersion or redispersible polymer powder is employed, the improvement comprising employing as said polymer dispersion and/or said redispersible polymer powder a low odor polymer dispersion or redispersible powder prepared by the process of claim 1.

* * * * *

UNITED STATES PATENT AND TRADEMARK OFFICE
CERTIFICATE OF CORRECTION

PATENT NO. : 6,756,454 B1 Page 1 of 1
APPLICATION NO. : 09/856190
DATED : June 29, 2004
INVENTOR(S) : Theo Mayer et al.

It is certified that error appears in the above-identified patent and that said Letters Patent is hereby corrected as shown below:

Column 9, Line 32, Claim 7:

Delete "2" and insert --1--.

Column 9, Line 35, Claim 8:

Delete "3" and insert --2--.

Signed and Sealed this

Twenty-second Day of May, 2007

JON W. DUDAS
*Director of the United States Patent and Trademark Office*